US011659841B2

(12) United States Patent
Van Blokland

(10) Patent No.: US 11,659,841 B2
(45) Date of Patent: May 30, 2023

(54) DEVICE FOR PROVIDING DOUGH PRODUCTS WITH A TOPPING MATERIAL

(71) Applicant: Radie B.V., BC Culemborg (NL)

(72) Inventor: Johannes Josephus Antonius Van Blokland, BG Laren (NL)

(73) Assignee: RADIE B.V., BC Culemborg (NL)

( * ) Notice: Subject to any disclaimer, the term of this patent is extended or adjusted under 35 U.S.C. 154(b) by 199 days.

(21) Appl. No.: 17/107,178

(22) Filed: Nov. 30, 2020

(65) Prior Publication Data
US 2021/0161153 A1 Jun. 3, 2021

(30) Foreign Application Priority Data
Dec. 3, 2019 (EP) .................................. 19213261

(51) Int. Cl.
A21C 9/04 (2006.01)
B05C 19/04 (2006.01)
B05C 19/06 (2006.01)
A23G 3/20 (2006.01)
A21C 15/00 (2006.01)
A23G 3/28 (2006.01)

(52) U.S. Cl.
CPC .............. *A21C 9/04* (2013.01); *A21C 15/002* (2013.01); *A23G 3/2076* (2013.01); *B05C 19/04* (2013.01); *B05C 19/06* (2013.01); *A23G 3/28* (2013.01)

(58) Field of Classification Search
CPC ...... A21C 9/04; A21C 15/002; A23G 3/2076; A23G 3/28; A23P 20/12; B05C 19/008; B05C 19/06

USPC ............................................... 118/13; 99/494
See application file for complete search history.

(56) References Cited

U.S. PATENT DOCUMENTS

| 4,197,794 A | 4/1980 | Raque et al. |
| 2008/0072771 A1 | 3/2008 | Marchl |
| 2008/0187637 A1 | 8/2008 | Spiegel |
| 2010/0040742 A1* | 2/2010 | Dijkhuis ................. A23L 7/122 426/94 |

(Continued)

FOREIGN PATENT DOCUMENTS

| EP | 0397882 A1 | 11/1990 |
| EP | 1188379 A1 | 3/2002 |
| EP | 2698064 A1 | 2/2014 |

(Continued)

OTHER PUBLICATIONS

The extended European search report dated Mar. 27, 2020, from European Application No. 19213261.1, 8 sheets.

(Continued)

*Primary Examiner* — Laura Edwards
(74) *Attorney, Agent, or Firm* — The Dobrusin Law Firm, PC

(57) ABSTRACT

Device for providing dough products with a topping material, comprising a dough product conveyor, for transporting the dough products, a topping conveyor, for conveying the topping towards a dispensing location above the dough product conveyor, a collector for superfluous topping material from the dough product conveyor and a topping material sensor for measuring the distribution of the topping material in width direction of the topping conveyor, a controller, for controlling, based at least on the signal from the topping sensor(s), the movements of a rake.

15 Claims, 2 Drawing Sheets

(56) References Cited

U.S. PATENT DOCUMENTS

2015/0047557 A1    2/2015  Nothum, Jr.

FOREIGN PATENT DOCUMENTS

| GB | 2223391 A | | 4/1990 |
|----|-----------|---|--------|
| JP | 2939224 B1 | | 8/1999 |
| JP | 11243835 | * | 9/1999 |

OTHER PUBLICATIONS

English Machine translation of JP11243835 published Sep. 14, 1999.

* cited by examiner

DEVICE FOR PROVIDING DOUGH PRODUCTS WITH A TOPPING MATERIAL

CROSS REFERENCE TO RELATED APPLICATIONS

This application claims priority of European Patent Application No. 19213261.1, filed on Dec. 3, 2019 in the European Patent Office, and herein incorporated by reference in its entirety.

TECHNICAL FIELD

The present invention relates to a device for providing dough products with a topping material.

BACKGROUND

Devices for arranging toppings on a dough product are known. U.S. Pat. No. 4,197,794 discloses a pizza topping device to apply ingredients to a pastry shell. Pastry shells are covered with a sauce and toppings are applied to the sauced pastry shell from above. The pizza toppings are mixed and arranged to be applied in a layer with a pre-selected depth.

In general, these systems run continuously, even when there is no pastry shell to be covered with toppings and sprinkled toppings on an empty factory line are lost. When excess toppings are fed back to the system they tend to clog up the supply of toppings, resulting in dense balls of toppings that cannot be spread evenly over the dough products. The dense topping balls may result in a deviation in the supply of the toppings. For example, the cross section of the arriving toppings might be deformed from a right pyramid like shape into an oblique pyramid shape. All in all the fresh toppings are not applied effectively and evenly to the dough product which results in unnecessary deterioration of these products.

SUMMARY

It is therefore a goal of the present invention to provide a device for providing dough products with a topping material, that takes away the above disadvantages, and/or to provide a useful alternative to the state of the art.

The invention thereto proposes a device for providing dough products with a topping material, comprising a dough product conveyor for transporting the dough products in a first direction of conveyance, a topping conveyor for conveying the topping material in a second direction of conveyance towards a dispensing location above the dough product conveyor, and provided with a first rake for moving the topping material with a directional component against the second direction of conveyance, a first topping sensor for measuring a deviation in a distribution of topping material in a width direction of the topping conveyor, at least a second rake positioned upstream, in the second direction of conveyance, of the first rake, wherein the second rake is movable with at least a directional component perpendicular to the second direction of conveyance for moving the topping material with a directional component perpendicular to the second direction of conveyance, and a controller, for controlling, based at least on the signal from the topping sensor, the movement of the second rake.

BRIEF DESCRIPTION OF THE DRAWINGS

The invention will now be elucidated into more detail, with reference to the following non-limitative figures.

DETAILED DESCRIPTIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
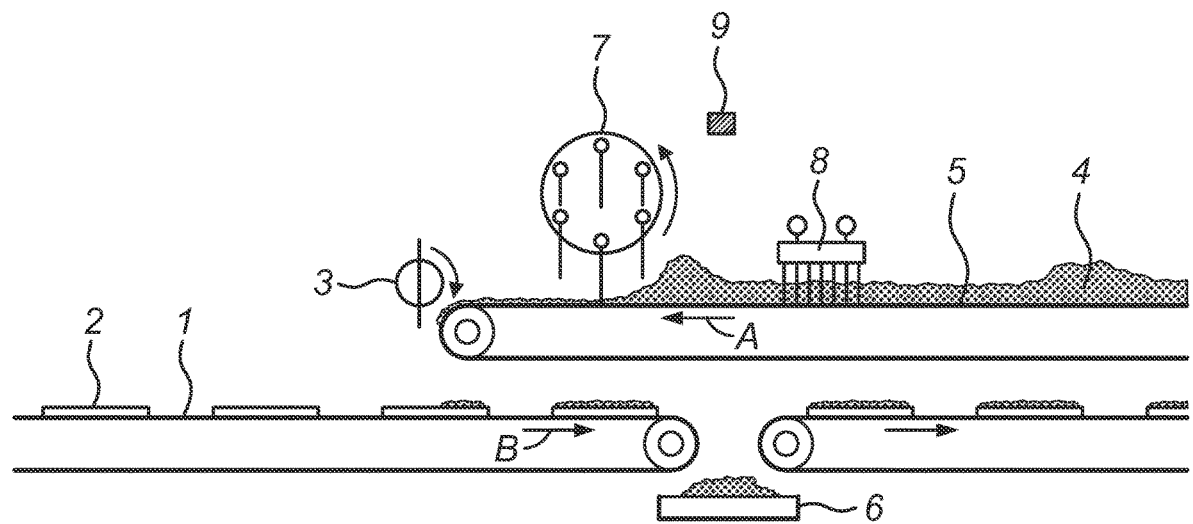
FIG. 1 shows a schematic side view of the present invention.

FIG. 1 schematically shows a side view of a device for providing dough products 2 with a topping material 4, comprising a dough product conveyor 1, for transporting the dough products 2 in a first direction B of conveyance, a topping conveyor 5, for conveying the topping material 4 in a second direction A of conveyance towards a dispensing location above the dough product conveyor 1, and provided with a first rake 7, for moving the topping material 4 with a directional component against the second direction A of conveyance and a first topping sensor 9 for measuring a deviation in a distribution C, D, E of topping material 4 in a width direction of the topping conveyor 5, a second rake 8, positioned upstream in the second direction A of conveyance, of the first rake 7, wherein the second rake 8 is movable with at least a directional component perpendicular to the second direction A of conveyance for moving the topping material 4 with a directional component perpendicular to the second direction A of conveyance, a controller, for controlling, based at least on the signal from the topping sensor 9, the movement of the second rake 8. Wherein the second rake 8 is a sliding rake 8, wherein said rake 8 is slidable in a direction perpendicular to the second direction A of conveyance, wherein said second rake 8 is configured to spread the topping material 4 at least in the width direction of the topping conveyor 5. The first B and the second direction A of conveyance are substantially parallel. Comprising a collector 6 for superfluous topping material 4 from the dough product conveyor 1. Comprising a topping dispenser 3 for dispensing topping material 4 onto the dough product conveyor 1.

Figure 2:
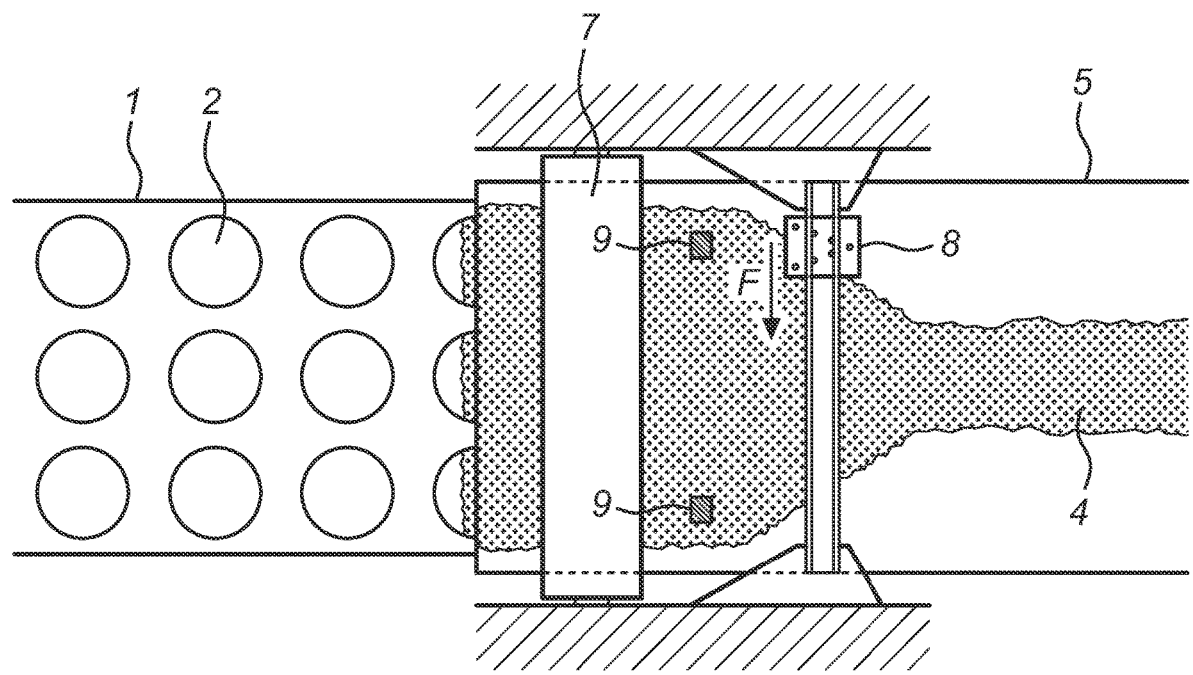
FIG. 2 shows a top view of the present invention.

FIG. 2 shows the top view of the above described device, further elucidating that the second rake 8 is a sliding rake 8, wherein said rake 8 is slidable in a direction F perpendicular to the second direction A of conveyance, wherein said second rake 8 is configured to spread the topping material 4 at least in the width direction of the topping conveyor 5.

Figure 3A:
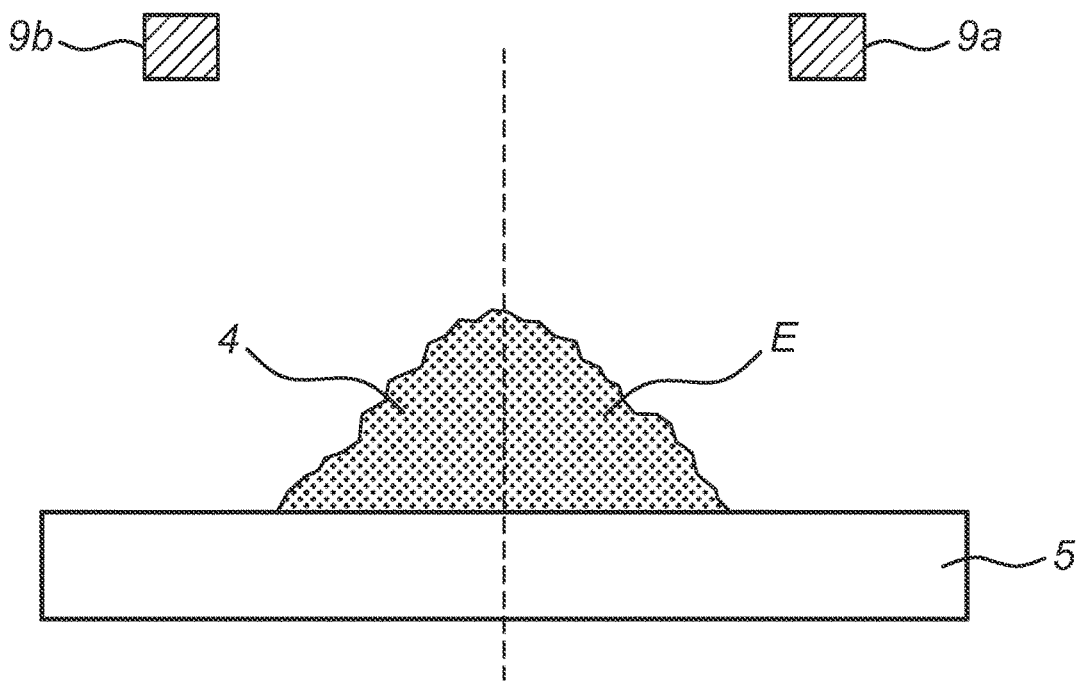
FIGS. 3a and 3b show a predetermined topping material distribution and a possible deviated topping material distribution respectively.
Figure 3B:
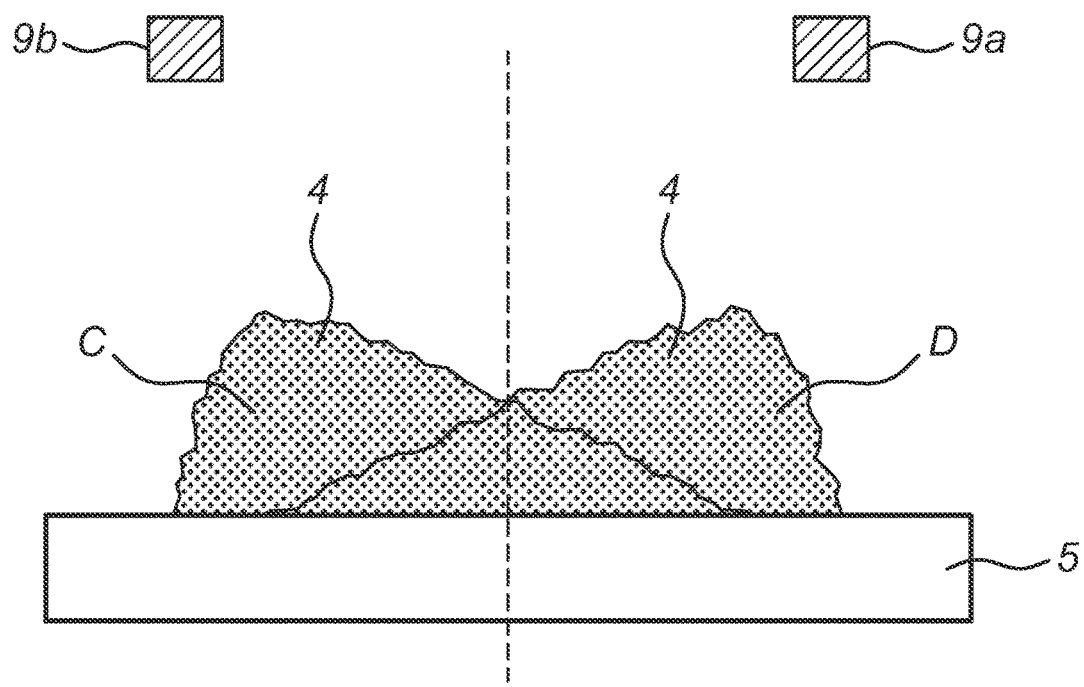

FIGS. 3a and 3b respectively show the predetermined distribution E of topping material 4 arriving on the topping conveyor 5 and a deviated distribution C, D of topping material 4 on the topping conveyor 5, wherein a second topping sensor 9b, together with the first topping sensor 9a, measures the deviation in the distribution C, D, E of topping material 4 in the width direction of the topping conveyor 5.

The device thereby has the advantage to compensate at least partially for the deviation in the distribution of topping material 4 in the width direction of the topping conveyor 5. As a result, after the topping material passed the two rakes, the present invention provides the dough products 2 on the dough product conveyor 1 with an evenly distributed topping layer. A substantially homogeneous distribution in the width direction saves topping material. The second direction A of conveyance is in particular in equal or in the opposite direction of the first direction B of conveyance. Topping material 4 may include cheese, vegetables, dairy products, herbs, spices, meat products, (dried) fruit and nuts. The controller may be configured to establish the preferred equal distribution over the width in front of the first rake 7, resulting in a predetermined equal level in front of the first rake 7.

In order to counteract a deviation in the arriving on the topping conveyor arriving topping material 4, the second rake 8 is a sliding rake, wherein said second rake 8 is slidable in a direction perpendicular to the second direction A of conveyance, wherein said second rake 8 is configured to spread the topping material 4 at least in the width direction of the topping conveyor 5. By sliding the second rake 8, at least partially, in the width direction of the topping conveyor 5 the present invention is able to provide the first rake 7 with a topping material distribution closer to the predetermined distribution of the arriving topping material. Therewith, unequally distributed topping over the dough products can be reduced.

In an alternative embodiment of the device, the controller is configured to initiate a sliding movement of the second rake 8 if the deviation, of the by the first topping sensor 9 measured topping material distribution, compared to a predetermined topping material distribution, deviates a predetermined value. Configuring the controller such that it anticipates on the deviation allows for quick compensation of the erroneous distribution of the topping material. The controller is preferably also configured for setting a rest time for the sliding rake 8 in its rest position, wherein said rest time is influenced by the measurements of the topping sensor.

In practical applications it is convenient that the first rake 7 is rotatable around an axis perpendicular to the second direction A of conveyance. By rotating the first rake 7 around the axis perpendicular to the second direction A of conveyance the best distribution of topping material is realized. The rotatable rake 7 may comprise at least one rake, but preferably two or three, and more preferably up to eight rakes applied in a carousel like manner, to spread the topping material evenly over the topping conveyor wherein dense clogs of topping material are separated.

The sliding rake 8 must not unnecessarily obstruct the arriving topping material. To allow for the passage of topping material 4, the second rake 8 comprises a rest position, wherein in said rest position the second rake 8 is positioned outside of the arriving topping material stream, and preferably as far as possible outside the arriving topping material stream, and wherein the second rake 8, upon initiation of the sliding movement, moves back and/or forth at least once over the width of the topping conveyor 5. In its rest position the topping material 4 is transported along the second rake 8, which is beneficial since the second rake only needs to be actuated if necessary. The back and/or forth movement is preferably once per a predetermined displacement of the topping conveyor 5, but is not limited thereto. Preferably the back and/or forth sliding movement of the second rake 8 ends just before the end of the width of the conveyor, in particular between 0 cm and 15 cm and more in particular about 5 cm before the end of the width of the conveyor.

In yet another embodiment of the device at least one second topping sensor 9b, together with the first topping sensor 9a, measures the deviation in the distribution of topping material 4 in the width direction of the topping conveyor 5. Through application of a second topping sensor 9b, the deviation in the topping material distribution can be measured more accurately. Hence, resulting in better distribution of the topping material since the second rake 8 can be more accurately initiated by the controller.

As a further addition the controller is configured for controlling a rest time in rest position and/or the relative speed of the second rake, for at least partially correcting the deviation in the arriving topping material distribution. Controlling the rest time and/or the relative speed of the second rake enhances its performance. The speed of the rake is important considering that if it were too slow, the deviation in the topping material distribution might pass through without being corrected. On the other side, if the second rake moves too fast the rake might be back at its rest position without correcting the erroneous part of the topping material distribution.

By default the predetermined topping material distribution is characterized by at least in width direction, a symmetrical shape, in particular a triangular like shape. This particular shape is caused by the supply of topping material on the topping conveyor. The symmetrical, triangular shape of topping material can be easily reshaped into a homogeneous layer of topping material by the two rakes. If in any case, the distribution is not in this particular shape, the controller is configured to counteract.

In a different embodiment a plurality pins, together with a body, forming the second rake 8, are positioned in a V-shape, wherein said V-shape is preferably pointing in the upstream direction of the second direction A of conveyance. Such shape has proven to lead to a very good topping material distribution. It turned out that moving in a transverse direction is better because of the interaction of the force of the topping conveyor in combination with the oblique angle and the force of the rake. Since the topping material clogs up fast, it is key to maintain a space between the second rake and the topping conveyor. In the topping conveyor and the pins extending from the second rake are vertically spaced apart. The space between the pins and the topping conveyor is preferably between 0.2 cm and 15 cm, more preferably between the 0.5 cm and 10 cm, but ideally between 1.5 cm and 5.0 cm. The vertical spacing has the advantage that topping material is not clogging up or squeezed onto the topping conveyor.

In a different embodiment the device may further comprise a collector for superfluous topping material from the dough product conveyor, a supply system (not shown), for supplying the topping conveyor 5 with topping material 4 from the collector 6 or from a reservoir (not shown) with fresh topping material, wherein the controller is further configured to control the amount of fresh topping material from the reservoir to be added to the collected superfluous topping material.

In practice, it appears that about one third of the dispensed topping material is returned. These superfluous toppings are collected and returned to the supply system by, for instance, a return conveyor or a bucket system. The controller controls the amount of toppings on the topping conveyor. When the amount of returned collected superfluous toppings is insufficient to top the dough products on the dough product conveyor, the reservoir with fresh toppings can be used, to supply additional fresh toppings to the topping conveyor. When sufficient collected toppings are available, the controller may halt the supply of fresh toppings and only feed collected toppings to the topping conveyor. The speed of the topping conveyor 5 (relative to the speed of the dough piece conveyor 1) is controlled to determine the amount of topping delivered to the dough pieces. The controlling of the amount and ratio of the toppings on the topping conveyor 5 ensures that the topping material 4 on the topping conveyor 5 does not stack and the topping material is not compressed. Therefore clots, balls of toppings and lumps of topping material can be avoided, yielding a more even and better reproducible distribution of toppings on the dough products. The dough product 2 may include pizza dough, bread dough, biscuit dough, and other dough suited to be supplied with toppings, and also pizza, bread, biscuits and other baked dough suited to be supplied with toppings.

In yet another embodiment the device may comprise a topping dispenser 3 for dispensing topping material 4 onto the dough product conveyor 1. The topping dispenser 3 provides a constant flow of topping to the dough products 2.

In a further embodiment the topping dispenser 3 comprises at least one dispensing roller, for equally dispensing the topping material over the dough product conveyor. The evenly distributed topping material 4 is evenly divided on the dough products 2 by the dispersion roller, which is located after the rake. The speed at which the dispersion roller rotate can be set by the operator, or by a control system. The dispensing roller may also be incorporated in a discontinuous conveyor system.

In a completely different embodiment, the at least one second rake may be rotatably arranged about a vertical axis of rotation and cooperate with a third rake that is also rotatably arranged about a vertical axis of rotation, wherein both rakes rotate in opposite directions, and wherein both rakes are arranged at a distance above the conveyor, such that they don't touch the conveyor and such that at least some topping material can pass underneath.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A device for providing dough products with a topping material, comprising:
    a dough product conveyor for transporting the dough products in a first direction of conveyance;
    a topping conveyor for conveying the topping material in a second direction of conveyance towards a dispensing location above the dough product conveyor; a first rake for moving the topping material with a directional component against the second direction of conveyance;
    a first topping sensor for measuring a deviation in a distribution of topping material in a width direction of the topping conveyor; a second rake positioned upstream, the second rake includes a plurality of pins positioned in a V-shape, in the second direction of conveyance, of the first rake. wherein the second rake is movable with at least a directional component perpendicular to the second direction of conveyance for moving the topping material with a directional component perpendicular to the second direction of conveyance; and
    a controller for controlling, based at least on a signal from the topping sensor, the movements and/or intervals of movement of the second rake.

2. The device according to claim 1, wherein the second rake is a sliding rake, wherein said second rake is slidable in a direction perpendicular to the second direction of conveyance, and wherein said second rake is configured to spread the topping material at least in the width direction of the topping conveyor.

3. The device according to claim 1, wherein the controller is configured to initiate a sliding movement of the second rake when the deviation of the topping material distribution measured by the first topping sensor deviates a predetermined value from a predetermined topping material distribution.

4. The device according to claim 1, wherein the first rake is rotatable around an axis perpendicular to the second direction of conveyance.

5. The device according to claim wherein the second rake is configured to engage in a rest position, wherein in said rest position the second rake is positioned outside of an arriving topping material stream, and wherein the second rake, upon initiation of a sliding movement, moves back and/or forth at least once over the width of the topping conveyor.

6. The device according to claim 1, further comprising at least one second topping sensor which together with the first topping sensor measures the deviation in the distribution of topping material in the width direction of the topping conveyor.

7. The device according to claim 1, wherein the controller is configured for controlling a rest time in a rest position and/or a relative speed of the second rake, and wherein the relative speed is related to the speed of a second conveyor, for at least partially correcting the deviation in the arriving topping material distribution.

8. The device according to claim 3, wherein the first topping sensor is configured to measure the predetermined topping material distribution in the width direction and has a symmetrical shape.

9. The device according to claim 8, wherein the first topping sensor is configured to measure topping material distribution in the width direction with the topping material is a triangular shape.

10. The device according to claim 1, wherein the pins together with a body form the second rake, and said V-shape is pointing in an upstream direction of the second direction of conveyance.

11. The device according to claim 10, wherein the topping conveyor and the pins extending from the second rake are vertically spaced apart.

12. The device according to claim 1, wherein the first and the second direction of conveyance are substantially parallel.

13. The device according to claim 1, comprising: a collector for superfluous topping material from the dough product conveyor; a supply system for supplying the topping conveyor with topping material from the collector or from a reservoir with fresh topping material; wherein: the controller is further configured to control the amount of fresh topping material from the reservoir to be added to collected superfluous topping material.

14. The device according to claim 1, further comprising a topping dispenser for dispensing topping material onto the dough product conveyor.

15. The device according to claim 14, wherein the topping dispenser comprises at least one dispensing roller, for equally dispensing the topping material over the dough product conveyor.

* * * * *

UNITED STATES PATENT AND TRADEMARK OFFICE
CERTIFICATE OF CORRECTION

PATENT NO. : 11,659,841 B2
APPLICATION NO. : 17/107178
DATED : May 30, 2023
INVENTOR(S) : Johannes Josephus Antonius Van Blokland It is certified that error appears in the above-identified patent and that said Letters Patent is hereby corrected as shown below:

In the Claims

Column 6, Line 30, insert --1,-- before "wherein the second"

Column 6, Line 45, delete "the" after "partially correcting"

Signed and Sealed this
Third Day of September, 2024

Katherine Kelly Vidal
*Director of the United States Patent and Trademark Office*